April 16, 1940.　　　A. A. HODGKINS　　　2,197,470
CLUTCH CONTROL MECHANISM
Original Filed Dec. 12, 1931
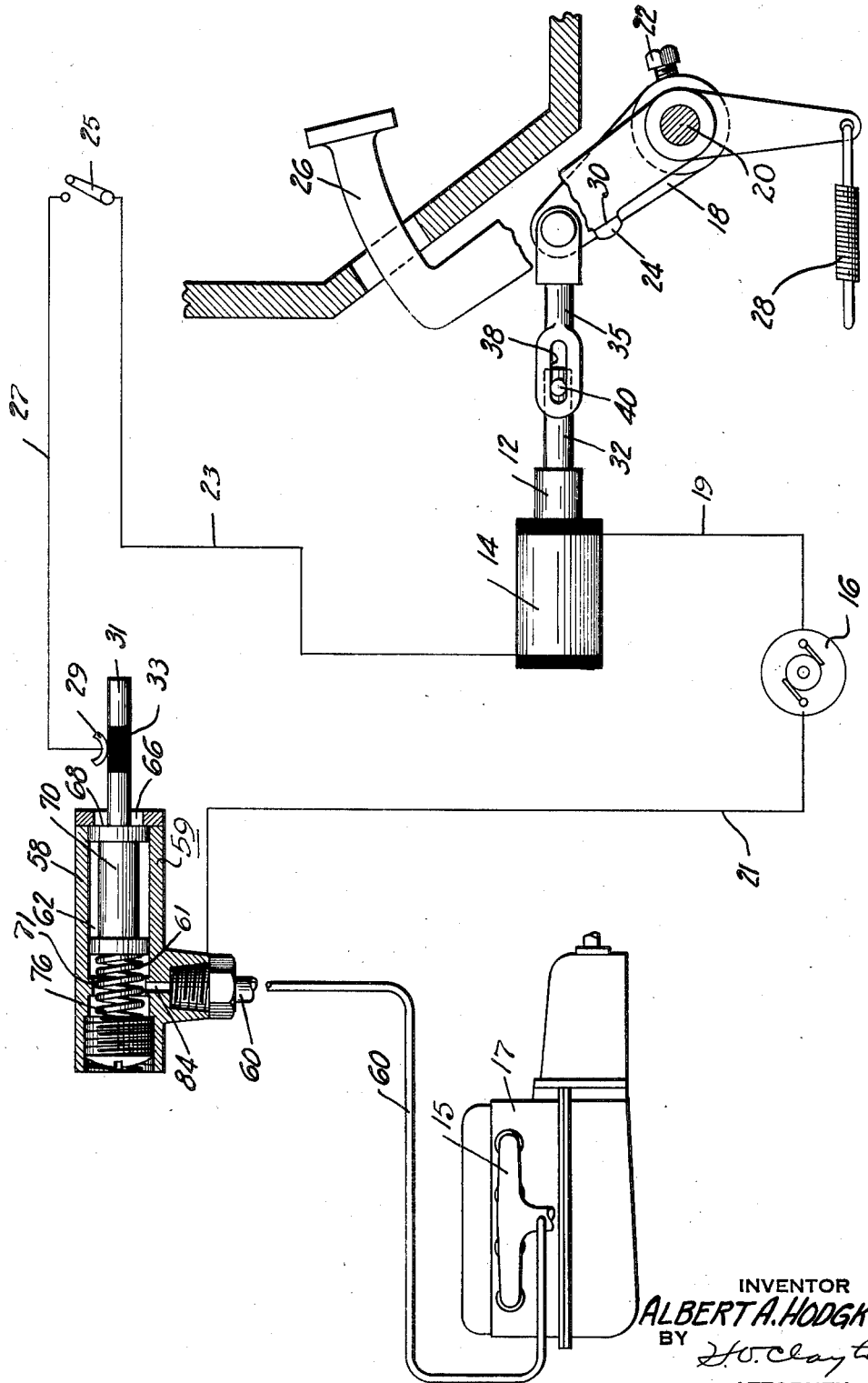
INVENTOR
ALBERT A. HODGKINS
BY H. O. Clayton
ATTORNEY Patented Apr. 16, 1940

2,197,470

UNITED STATES PATENT OFFICE 2,197,470

CLUTCH CONTROL MECHANISM

Albert A. Hodgkins, Lynn, Mass., assignor to Bendix Products Corporation, South Bend, Ind., a corporation of Indiana Original application December 12, 1931, Serial No. 580,526. Divided and this application March 11, 1937, Serial No. 130,230

2 Claims. (Cl. 192—90)

This invention relates broadly to the automatic performance of shifting movements by means of power actuators or servo motors. More particularly, the invention relates to the automatic control of such power actuators of servo motors.

It has heretofore been proposed to provide a pneumatically operated motor actuated by the sub-atmospheric pressure in the intake manifold of an internal-combustion engine, the piston or diaphragm thereof being linked to the clutch pedal, say, of a self-propelled vehicle, to cause the setting and release of the clutch by the variations of the fluid pressure in the manifold. To control the operation of the motor, a valve has been provided in the communicating passage between the engine and the motor, which valve has been actuated mechanically from the throttle of the engine.

An important object of the invention is to provide a simple type of electro-magnetically operated clutch operating motor, the control means for said motor including a simple, compact and effective pressure differential operated motor, the latter serving to operate a control switch for the motor.

Yet another object of the invention is to provide a pneumatically operated power device for operating a control switch, which device shall be self-actuating and dependent only upon the degree of gaseous pressure within the intake manifold of an automobile engine. To this end there is provided a control device susceptible to fluctuation in the fluid pressure in the intake manifold or cylinders of an internal-combustion engine.

These and other objects of the invention and the means for their attainment will be more apparent from the following detailed description of a preferred embodiment, which description is taken in connection with the accompanying drawing, in which the sole figure is a view, somewhat diagrammatic, showing the clutch control mechanism constituting my invention, said mechanism including a pressure differential operated switch operating motor controlling an electrically energized motor for disengaging the clutch of a motor vehicle.

The invention is illustrated as applied to a clutch control for motor vehicles, although that is only one of its many applications.

In previous proposals for the control of clutches in motor vehicles, the clutch pedal has been connected to one side of the piston or diaphragm of a vacuum cylinder or servo motor, while the cylinder on the other side of the piston has been in communication with the intake manifold of the engine through a pipe which is controlled by a valve. The valve is normally closed by a spring to shut off the power cylinder from the vacuum in the manifold. Valve operating means is connected with the foot throttle of accelerator pedal, so that when the accelerator pedal is released and the accelerator pedal spring returns it to normal position, it opens the valve in the vacuum line and permits the vacuum in the manifold to draw the piston in the cylinder and thus depress the clutch pedal and release the clutch. When the accelerator is depressed, the valve closes and the clutch pedal is released to permit the clutch to engage. Among the disadvantages of this type of clutch control is that it is effective solely when actuated by the operator of the vehicle and is not responsive to the load on the engine and does not automatically release the clutch when the momentum of the vehicle is in excess of the speed of the engine.

The present invention when applied as a clutch release for automotive vehicles provides a true free-wheeling in that the engine is automatically declutched from the propeller shaft whenever the momentum of the vehicle exceeds the propulsive effort of the engine.

It has been found that the conditions of sub-atmospheric pressure or vacuum in an internal-combustion engine fluctuate with the load on the engine. That is, when there is no load on the engine, the downward movement of the pistons on the intake stroke increases the rarefication in the intake manifold and combustion chamber. Similarly, this rarefication in the intake manifold and combustion chamber increases as the throttle valve controlling the carburetor is closed. Thus, for example, when the vehicle is stationary and the engine idling, the rarefication of atmosphere, or, as it is said, the vacuum in the manifold is high. If the throttle is opened, due to the inrush into the intake manifold and combustion chamber of the explosive mixture, the rarefication or vacuum drops momentarily and then gradually builds up again as the pistons reciprocate. Thus, when the vehicle commences to move, first because of the opening of the throttle and then because of the load on the engine, there results a decrease in the rarefication of the atmosphere or vacuum in the manifold, but as the vehicle gathers momentum, the load on the engine decreases and the vacuum increases in the manifold and explosion chambers. Advantage is taken of this fluctuation of the fluid pressure in the manifold and explosion chambers by providing a switch operating means which is susceptible to such fluctuation. In other words, when applied to the intake manifold and/or combustion chambers of an internal-combustion engine or any other chamber in which the fluid pressure fluctuates, the switch operating means is responsive to fluctuations or variations in the degree of vacuum and is self-opening and closing dependent upon the degree of rarefaction in the chambers.

The invention is illustrated as applied to motor means, preferably an electro-magnetic or solenoid motor, adapted to actuate or shift the clutch releasing lever in an automotive vehicle, but it will be readily apparent that the invention is equally applicable to any sort of controlling instrumentality for any purpose. The switch for controlling said motor may be operated by a vacuum operated motor; however, it will also be readily apparent that said switch controlling motor may be operated by any source of fluid pressure in which the fluid pressure fluctuates. In the illustrated embodiment, the fluctuating fluid pressure existing in the intake manifold and explosion chambers of an internal-combustion engine is the source, but broadly, any source of rarefied atmosphere will be contemplated and in such broad aspect will be referred to as a chamber in which the fluid pressure fluctuates, or as suction inducing means.

Referring now to the drawing, disclosing a preferred embodiment of my invention, movable armature 12 of an electro-magnetic motor 14 is shown as connected, by links 32 and 35, with a clutch actuating mechanism 18, 20 of a motor vehicle. The link 35 is provided at its end with a slot 38 cooperating with a pin 40 extending from the end of the link 32 to thereby provide a lost motion connection. The clutch shifting arm 18 is fixed on the shaft 20, as by a set screw 22, and has a lug or protuberance 24 thereon. This arm 18 and the shaft 20 to which it is affixed normally assume the position shown in the figure of the drawing, by virtue of the clutch spring (not shown), which normally urges the clutch elements into engagement. Loosely mounted on the shaft 20 is a foot pedal 26, which is normally retained in the elevated position by means of a spring 28. The foot pedal 26 has a bearing surface 30 for engagement with the protuberance 24 on the arm 18. Thus, when the foot pedal 26 is depressed, the arm 18 is rotated in a counter-clockwise direction to release the clutch, but when the motor means 14, next to be described, is operated, the clutch operating shaft 20 is turned, but the foot pedal 26 does not move.

The source of electrical energy is indicated as a generator 16 in circuit with the motor 14 by a wire 19. The other brush of generator 16 is, conveniently, electrically connected with the switch casing 58 by a wire 21. The other terminal of the electro-magnetic motor 14 is connected, say, by wire 23 to a circuit closing device 25 on the instrument panel of the vehicle and the other pole of the switch is electrically connected, as by wire 27, to a contact, shown as a wiper 29 proximate the switch casing 58.

The tubular casing of the motor 59 has only one port 84, communicating with a conduit 60 leading to the intake manifold 15 of the internal-combustion engine 17 of the vehicle, in which manifold the fluid pressure fluctuates. The interior of the casing 58 provides a chamber, indicated by the reference numeral 62, and within this chamber there reciprocates a plunger or power element 70, one face 68 of which is subjected to atmospheric pressure through the vent 66. Force is applied to the other side of the plunger by an adjustable spring 76. Attached to the plunger is a rod or finger 31 adapted for engagement by the wiping contact 29 at all times. The casing 58, plunger 70 and rod 31 are of conductive material and, hence, form part of the electrical circuit including the generator. When the switch 25 is closed the circuit, including the motor 14 and generator 16, is thus completed and the motor energized to retract the movable part 12. However, it is only desirable that the circuit be completed when the plunger 70 is retracted against spring 76 under conditions of predetermined high vacuum in the suction inducing means 15 and hence the rod 31 is covered with non-conductive material 33 at that place or all places where the rod 31 contacts with wiper 29 except when the rod is retracted within the motor 59 under conditions of high vacuum. Hence, except when the vacuum in the intake pipe, in the illustrated embodiment, reaches the predetermined maximum, the circuit is interrupted by the insulating member 33 interposed between the two contact members 31 and 29.

In order that the operation of the device may be clearly understood, it must be appreciated that when the engine is not operating, that is, when it is at rest, the fluid pressure of the gaseous contents of the intake manifold is substantially atmospheric pressure because the intake manifold is in communication with the inlet of the carburetor. When the crank shaft is turned over, as by a self-starter, the fluid pressure in the manifold is sub-atmospheric and results from the down stroke of the piston. The sub-atmospheric pressure is increased somewhat, i. e., the suction is lessened, however, in the manifold by the in-rush of air through the inlet of the carburetor, or, as is said, the vacuum is decreased. Thus, if a motor vehicle is standing and the engine is idling with the transmission gears out of mesh, the fluid pressure in the manifold may be found on a gauge to be, say, ten pounds (twenty inches of mercury). When the clutch is released, the propeller shaft connected through low gear with the engine, the clutch reengaged, and the throttle valve opened, there is a momentary increase in the fluid pressure, i. e., decrease in the vacuum, in the manifold, say, to three pounds. As the car gathers momentum, the vacuum in the manifold increases until it registers ten pounds on the gauge again. This same cycle of conditions occurs at every shift to another gear ratio. Again, when the vehicle is traveling along the level, or on a down grade, it frequently happens that the momentum of the car, and hence the revolutions per minute of the propeller shaft, exceeds the speed of rotation of the crank shaft of the engine and hence, the engine being relieved of load, the vacuum in the manifold again increases. It will thus be seen that there is a condition of high vacuum in the intake manifold of the engine at times when there is no load on the engine, and at such times there is no occasion for the engine to be clutched to the propeller shaft of the vehicle. At other times, as in starting and when there is a load on the engine, the propeller shaft must be clutched to the engine and this is at a period of low vacuum in the manifold.

In accordance with this invention, the switch operating motor 59 for accuating the controlling switch for the motor 14 is so constructed as to be actuated by the aforesaid predetermined high vacuum of the engine to close the switch mechanism, that is, the wiper 29 and contact 31, to thus effect an energization of the motor 14.

Normally, in periods of low vacuum in the manifold, the power element 70 assumes the inactive position illustrated in the drawing. When the power element is disposed in such position, the insulating member 33 serves to break the circuit interconnecting the generator 16, motor 14 and cut-out switch 25. The motor 14 is thus de-energized and the clutch springs function to engage the clutch. This condition obtains so long as the vacuum in the manifold is below a predetermined maximum.

When the vacuum in the manifold rises to or above a predetermined value, the reduction in fluid pressure on the face 61 of the plunger 70 permits atmospheric pressure, acting through vent 66 on the face 68 of the plunger, to overcome the force of the spring 76, and the plunger is moved to the left until stopped by the piston stop 71. In such position, the aforementioned circuit is completed to thus energize the motor 14 to disengage the clutch.

It will thus be seen that a construction is provided which, when applied to the clutch of a self-propelled vehicle, affords automatic free-wheeling whenever the prime mover is relieved of load without manual actuation of any instrumentality whatsoever. It will be further noted that the controller switch of this invention is applicable with any sort of power actuator or motor or the like for automatically actuating mechanical elements, as for instance, automatically setting or releasing clutch elements, moving steering mechanisms, setting or releasing brake mechanisms, selectively operating change-speed mechanism or performing other shifting movements under the influence of variations of fluid pressure, particularly for automotive vehicles operating on land, on or in the water, or in the air or in fact in any situation where an internal-combustion engine or other prime mover has a chamber in which the fluid pressure fluctuates.

The invention heretofore described is disclosed in my Patent No. 2,077,413, issued April 20, 1937, this application constituting a division thereof.

While one illustrative embodiment has been described, it is not my intention to limit the scope of the invention to that particular embodiment, or otherwise than by the terms of the appended claims.

I claim:

1. In an automotive vehicle provided with an internal-combustion engine, an accelerator and a clutch, power means for operating the clutch comprising an electro-magnetically operated motor unit operably connected with the clutch, means for controlling the operation of said unit comprising a switch and power means for operating said switch comprising an automatically operable pressure differential operated motor, and fluid transmitting means so connecting said latter means with the intake manifold of the engine that when the manifold is partially evacuated the motor is immediately thereafter also partially evacuated and accordingly energized to thereby operate said switch to effect a disengagement of the clutch.

2. In an automotive vehicle provided with an internal-combustion engine, an accelerator and a clutch, power means for operating the clutch comprising an electro-magnetically operated motor unit operably connected with the clutch, and further comprising a source of electrical power, means for controlling the operation of said unit comprising (1) a pressure differential operated motor including a fixed casing and a movable power element and (2) a switch connected to said latter element, means interconnecting the electro-magnetically operated motor, the switch and the source of electrical power, together with means for effecting an energization of the pressure differential operated motor by subjecting its power element to a differential of pressure.

ALBERT A. HODGKINS.